Nov. 19, 1963  R. W. FROELICH ETAL  3,111,644
VALVE CAP TRANSMITTER
Filed June 5, 1962  2 Sheets-Sheet 1
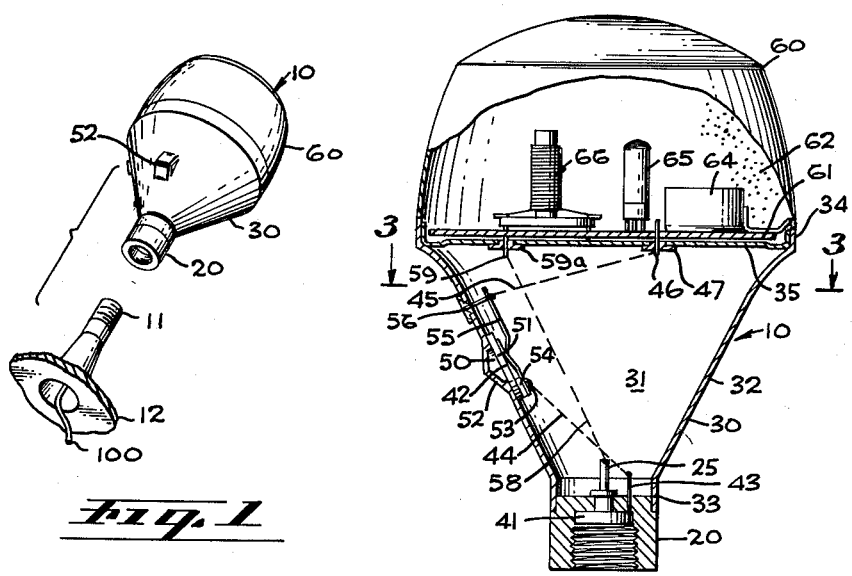
Fig. 1
Fig. 2
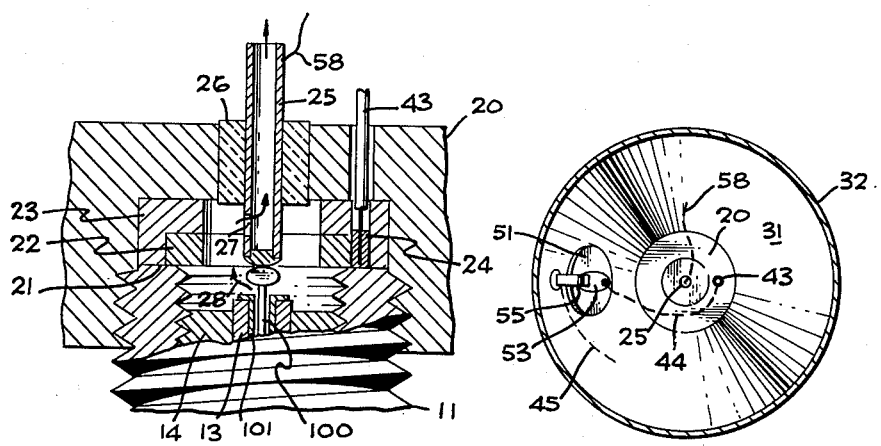
Fig. 4
Fig. 3
WALTER F. FROELICH
RONALD W. FROELICH
INVENTORS
BY
Beehler & Shanahan
ATTORNEYS Nov. 19, 1963  R. W. FROELICH ETAL  3,111,644
VALVE CAP TRANSMITTER
Filed June 5, 1962  2 Sheets-Sheet 2
*fig. 5*
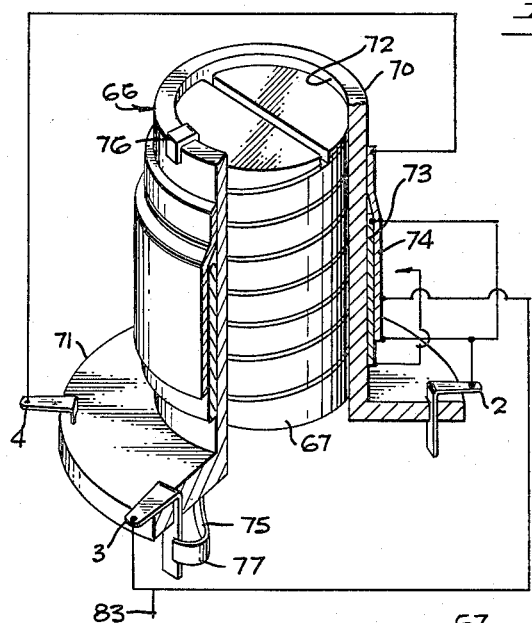
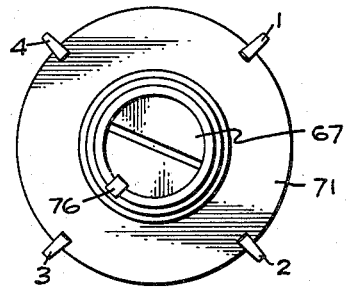
*fig. 5a*
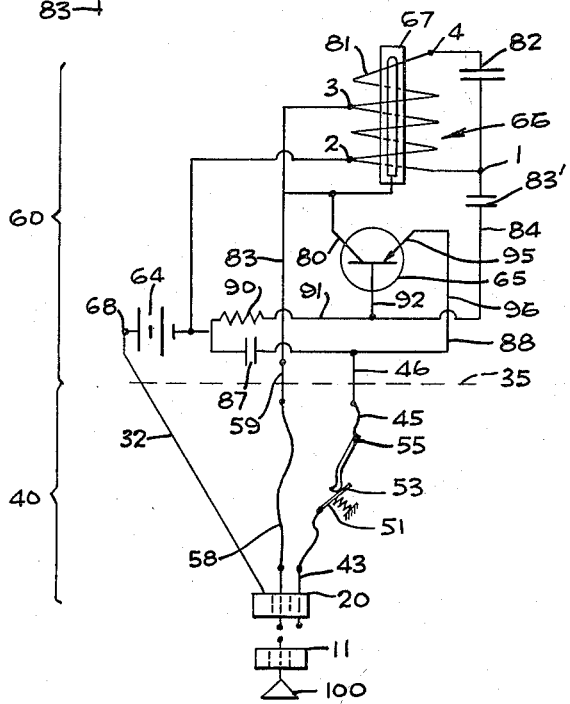
*fig. 6*
WALTER F. FROELICH
RONALD W. FROELICH
INVENTORS
BY
*Beehler & Shanahan*
ATTORNEYS

United States Patent Office 3,111,644
Patented Nov. 19, 1963

3,111,644
VALVE CAP TRANSMITTER
Ronald W. Froelich and Walter F. Froelich, Torrance, Calif., assignors to Sierra Electric Corporation, Gardena, Calif., a corporation of California
Filed June 5, 1962, Ser. No. 200,120
10 Claims. (Cl. 340—58)

This invention relates generally to tire pressure alarm devices and the like; more particularly, the invention is a valve cap transmitter which can be threaded or otherwise mounted on a tire valve or the like in place of a standard valve cap. The valve cap transmitter contains a radio transmitter which is actuated only upon the closure of two switches, one being closed by mounting of the valve cap on the valve, and the other being closed by a pressure sensing means associated with a pressure chamber within the valve cap transmitter itself. Despite its miniature size, the valve cap transmitter achieves effective transmission by virtue of a double antenna system, one part extending through the valve to the interior of the tire or other pressure vessel, and one part being a tunable ferrite slug which, together with the transmitter is carried in a non-shielding package external to the metal portions of the valve cap transmitter.

A pressure of air inside of automobile tires, particularly tires on heavy trucks, should be maintained at a specified minimum to insure both road safety and maximum tire life. Underinflation, particularly unequal underinflation of one or more tires can result in such dangerous instability of a large truck as to cause it to overturn when maneuvered at high speed. Even if the underinflation does not result in an accident, it will result in excessive tire wear if it continues for a long time.

Many tire pressure warning devices have been known in the past. However, none of these has been self-contained in a valve cap. All have relied on wires leading from the tire valve to some relatively complex separate tire warning system, such as a wheel mounted transmitter or wiring means leading to signal devices within the truck or automobile cab.

Tire pressure warning transmitters heretofore known have generally been rather bulky devices with conspicuous and vulnerable projecting antenna. Any auxiliary device mounted on the wheel rim attracts attention, invites tampering, and is in a position so exposed as to make it very vulnerable to damage during ordinary use.

On the other hand, attempts to use small transmitters heretofore known, have not been successful because a good antenna system is required for successful transmission from wheel to truck cab by means of a very small low-powered transmitter.

A radio transmitter and a pressure detection means are both precision instruments. Truck operators and repairmen are not equipped by experience or equipment to service, adjust, or tune such devices. Tire pressure warning transmitters heretofore known have generally presented exposed assemblies of valves, pressure detection means, transmitters and transmitter tuning means which required unavailable skills to work most effectively on the truck, and which baffled truck personnel who attempted to use or repair them.

It is therefore a major object of the present invention to provide a tire pressure warning transmitter in the form of a valve cap and valve body antenna which can be threaded on and in the standard tire valve stem threads in place of the valve cap and valve body familiar to truck operators. No wiring or air tube connections are required. It is unnecessary to mount anything on the automobile or truck wheel, and no antenna whatever is exposed or visible.

It is another important object of the invention to provide a valve cap transmitter which is entirely self-contained as to power and switching. The present invention is switched from a disconnected storage condition to a power-connected operating condition merely by being threaded onto the valve stem like any other valve cap, and without the operator concerning himself about any electrical connection whatever.

It is another major object of the present invention to provide a valve cap transmitter in which an entirely adequate double antenna system can be provided within protective but non-shielding containers. In the present system, one antenna is distributed within the non-shielding tire itself, and the other antenna system is a ferrite slug supported at a distance spaced from the tire-enclosed antenna.

It is still another object of the present invention to provide a miniature transmitter which can be precisely tuned at the time of manufacture, and then potted in a manner which will retain the tuned elements, and all other elements, in the factory inspected condition, regardless of road shock and vibration.

It is still another object of this invention to provide a valve cap transmitter so small that the truck operator can conveniently carry spares within a truck.

A further object of the invention is to provide a valve cap transmitter with the electric wiring and switching hermetically sealed within a shielding metal container, separate and apart from the transmitter proper.

Still another object of the invention is to provide a valve cap transmitter in which the electrical switching system and the transmitter can be fabricated as entirely separate units which can be readily assembled to one another and interchanged with one another.

The foregoing and other objects of my invention will be understood from the following description of one preferred specific embodiment of the invention illustrated in the accompanying drawings, in which:

FIGURE 1 is a perspective view of a valve cap transmitter as it is about to be threaded upon the valve of a tire, the tire being indicated only fragmentarily;

FIGURE 2 is a side elevational view of the valve cap transmitter of FIGURE 1, with the lower half shown in section at a vertical plane through the longitudinal axis of the valve cap transmitter, and the upper portion having the potting material enclosing the transmitter partially broken away to reveal transmitter components;

FIGURE 3 is a plan view of a horizontal section taken through the valve cap transmitter at a plane indicated in FIGURE 2 by the arrows 3—3;

FIGURE 4 is a sectional view, in enlarged detail, of the threaded connection between the valve cap transmitter and the tire valve, showing the valve switching and antenna connection which place the valve cap transmitter in readiness for operation;

FIGURE 5 is a perspective view of the tuning coil of the valve cap transmitter, one quarter of the tuning coil being broken away to reveal the tuning slug threadably received therein;

FIGURE 5a is a plan view of the tuning coil and slug assembly showing the coils for electrical connections; and FIGURE 6 is a wiring diagram of the valve cap transmitter.

In FIGURE 1, the numeral 10 indicates a valve cap transmitter constructed according to the invention. Its three principal sections, seen from the exterior, are an internally threaded valve cap 20, a pressure chamber 30, and a transmitter 60.

Valve cap 20 is internally threaded so as to be received on a standard valve stem 11, which is part of a tire or tire tube 12.

As will be explained, hereinafter, part of the invention is an antenna 100 which extends through the valve stem 11 into the interior of the tire 12.

The partially sectioned view of FIGURE 2 reveals that the pressure chamber 30 has an interior space 31 enclosed by walls comprised of a sheet metal cone 32, which diverges from a small cylindrical inlet 33 to an upper cylindrical flange 34 at the large end of cone 32. Small cylinder 33 is plugged by valve cap 20, which is brazed or otherwise bonded therein to form a unitary structure. A disc-shaped cover 35 covers the large end of cone 32, being closely received within cylindrical flange 34 and bonded at the edges to provide a hermetically sealed space within pressure chamber 30.

The transmitter 60 is seen to be comprised of circuit elements, to be described in detail, hereinafter, mounted on a circuit board 61, which is, in turn, mounted on the exterior surface of disc 35; and a non-metallic, non-shielding potting material 62. The potting material 62 may be one of the insulating and weather resistant foaming plastics molded so as to embed the circuit board 61, and the circuit elements thereon, in an insulating and protecting inert material, which may be molded to a suitable shape as shown directly into the cylindrical space within cylindrical flange 34, exterior to pressure chamber cover 35.

Preferably, also, valve cap 20 and pressure chamber cone 32, including flange 34, are metal, and serve as the "ground" circuit element for completing the electric circuitry of the entire device 10. On the other hand, it is much preferred that the potting material 62 in which the elements of transmitter 60 are embedded, be neither electrically conducting or electrically shielding, since it is desirable to provide the transmitter 60 with two radiating antenna means, first the antenna 100 within the tire tube 12, and secondly a ferrite slug antenna, to be described hereinafter, which radiates directly from the transmitter elements embedded in potting material 62.

FIGURE 2 also best illustrates the three largest circuit elements of transmitter 60, which are mounted on the printed circuit board 61. The power source for transmitter 60 is a miniature mercury battery 64, or the like. A single transistor 65 provides the amplifier means required in the single stage transmitter oscillator, for which the circuitry will be described in connection with FIGURE 6, hereinafter. The numeral 66 indicates a tuning coil assembly, illustrated in greater detail in FIGURES 5 and 5a which also contains the ferrite slug 67.

The transmitter 60 also requires other standard circuit elements not illustrated in FIGURE 2, since they are less conspicuous and best understood from the wiring diagram of FIGURE 6.

The transmitter 60 is controlled by a switching circuit, indicated generally by the numeral 40, within the pressure chamber 30. The circuit of transmitter 60 is energized by the battery 64 only upon the closing of two internal switches in series, a valve switch 41, and a pressure switch 42.

In the preferred embodiment illustrated, the battery 64 is grounded by means of ground connection 68 to the metal cone 32, and hence, also to the metal valve cap 20. However, no electrical energy can flow through the conical member 32 and valve cap 20 and back to the electrical circuit 40 unless valve switch 41 is closed by contact with the tire valve stem 11, by virtue of a construction to be described hereinafter in connection with FIGURE 4.

When valve cap 20 is fully threaded on tire valve stem 11, so that the end of the latter seats against the bottom of the threaded recess 21 of valve cap 20, an insulated valve cap terminal 43 is placed in connection with the grounded side of battery 64. Insulated valve cap terminal 43 is in turn connected with pressure switch 42 by way of a pressure switch lead 44. Pressure switch 42 is in turn connected to the transmitter 60 by way of a transmitter lead 45 and a power connection prong 46, which passes through the cover 35 by way of an insulating bushing 47. A preferred construction for the pressure switch 42 is illustrated in FIGURES 2 and 3. The wall of the cone 32 is pierced at one point by a small hole 50, which is covered by a resilient rubber diaphragm 51. Preferably, the diaphragm 51 is protected from puncture by particles of rock, ice, or road debris, by a metal guard 52, which is open at both sides to allow for the passage of air, as may be seen from the perspective view of FIGURE 1.

The interior side of the diaphragm 51 is provided with a metal lead or coating 53, which is electrically connected to pressure switch lead 44, but is insulated from the cone 32 by means of an insulator 54. A switch finger 55 is supported on an insulated mounting 56 so as to contact the diaphragm lead 53 only when the diaphragm 51 is not outwardly deflected by the existence of a predetermined fluid pressure in the interior of pressure chamber 30. Switch finger 55 is in turn connected to the transmitter 60 by way of the transmitter lead 45, and the prong 46, as already described. The enlarged and detailed sectional view of FIGURE 4 illustrates a preferred construction for valve cap 20 and the valve switch 41, which it contains. The inner end of the threaded recess 21, within valve cap 20, contains a copper washer 22, which is insulated from the valve cap 20 by means of a surrounding insulating washer 23. Copper washer 22 is electrically connected to the insulated valve cap terminal 43 by a good soldered connection at 24. No current can pass through valve cap 20 to insulated valve cap terminal 43 until the valve stem 11 bottoms in recess 21 and provides electrical communication between the valve cap 20 and the copper washer 22. It is this connection which constitutes the valve cap switch 41 in the preferred embodiment illustrated.

Simultaneously with closure of valve cap switch 41, by contact of the copper washer 22 with the valve stem 11, the antenna 100, within the tire 12 is electrically connected to transmitter 60 by way of a metal valve opener 25, an antenna lead 58 through pressure chamber 30, and an antenna connection prong 59 mounted in pressure chamber cover 35 by means of an insulating bushing 59a.

The length of antenna wire 100 used in the tire 12 is not critical as to length, position, or size, as its connection is made at a point of low impedance, namely the collector of transistor 65, as will be described hereinafter in connection with the circuit diagram of FIGURE 6. However, the antenna 100 must be insulated by insulation 101 in the portion that passes through the movable valve body 13 within the valve 14, which is contained within valve stem 11. Likewise, it is necessary that the valve opening probe 25 be insulated from valve cap 20 by an insulating bushing 26.

Capping the valve stem 11 with valve cap 20 not only closes the valve switch 41, and connects antenna 100 to transmitter 60, but also opens valve 14, to permit the flow of inflation air from the interior of tire 12 to the interior 31 of pressure chamber 30. As seen in FIGURE 4, the valve opener 25 is tubular in construction, and has an opening 27 in the interior of valve cap recess 21. Thus, when the lower end of the valve opener 25 pushes down on antenna 100 and movable valve member 13, thus opening valve 14, air passes through valve stem 11, into the interior of valve cap recess 21, through opening 27, and up through tubular valve opener 25 into pressure chamber 30 in the manner indicated by the arrows 28. Since this air flow occurs only when valve cap 20 is tightly seated on valve stem 11, and the amount of air required to fill pressure chamber 30 is very small, the loss of air from tire 12 into pressure chamber 30 does not produce any appreciable reduction in tire inflation pressure.

When, however, a puncture or the like causes the tire 12 to lose inflation air, the pressure within both tire 12 and pressure chamber 30 falls until, at a predetermined pressure, the pressure of outside atmospheric air on diaphragm 51, and the diaphragm's own resiliency, produce closure of pressure switch 42. When that occurs, transmitter 60 is energized, since both the valve switch 41 and the pressure switch 42 are closed. An R.F. signal is then radiated from the double antenna system to be described hereinafter in connection with FIGURES 5 and 6, which can be received on a suitable receiver in the truck or automobile cab, thereby alerting the driver to the need for repairing, reinflating or replacing the underinflated tire.

In FIGURE 5, it is seen that the tuning coil 66 is constructed of a coil form 70, of insulating material, having an annular base flange 71. The inner bore 72 of coil form 70 threadably receives ferrite tuning slug 67.

Inner and outer coil windings 73 and 74, respectively, are wound on the exterior cylindrical surface of coil form 70.

The base flange 71 of the coil form 70 is provided with four metal conductors numbered 1 to 4, as illustrated in both FIGURE 5 and FIGURE 5a, which provide convenient means for connecting tuning coil 66 and tuning slug 67 in the circuit of FIGURE 6.

Tuning slug 67 is electrically connected to terminal number 3 regardless of its longitudinal position within the bore 72 of coil form 70, by virtue of a longitudinally disposed brass strip 75, which extends from a fastening point 76 at the upper end of coil form 70 to a connection end 77 at terminal 3.

The wiring diagram of FIGURE 6 provides a diagrammatic representation of the transmitter 60 above the pressure chamber cover 35 (indicated in FIGURE 6 by a dashed line), and the electrical circuit system 40 below the cover 35. The electrical connections and the antenna connection between valve cap 20 and the valve stem 11 are indicated schematically at the lower end of the wiring diagram.

The transmitter 60 is seen to be a single transistor, CW oscillator. The collector lead 80 of the transistor 65 is tapped on the coil 81 (comprised of inner and outer coils 73 and 74) and an intermediate point to reduce the effects of thermal drift caused by the transistor in the circuitry, and to give a high peak-to-peak induced voltage across the coil. A temperature compensating capacitor 82 is also provided.

Antenna 100, within the tire 12, is connected through circuitry already described, and lead 83 to terminal 3, to which the collector 80 and the ferrite slug 67 are also connected.

Additional circuit elements are the capacitor 83 provided in line 84 between the transistor 65 and coil terminal 1; a capacitor 87 in line 88 directly across the power source; and a resistance 90 in line 91 from the power source to the transistor terminal 92 in transistor 65. Connection of the emitter 95 to the power terminal 46 is accomplished by means of line 96.

Tuning is accomplished at the factory by means of adjustment of the coil slug 67 prior to potting in potting material 62.

Typical power output from the transmitter illustrated is in the range of ten to fifteen milliwatts.

A typical transmission frequency is 3.4 megacycles but the transmitter has been designed to be adjustable for any anticipated operating frequency in a range from about 2.8 to over 9.5 megacycles. Adjustment at the factory may then be used to select a typical alarm frequency in a range from about 3 to about 6.5 megacycles, depending upon the type of receiver used in the truck cab and other possible local interference.

Signals from the valve cap transmitter disclosed herein may be received on a suitable superheterodyne receiver, using crystal controlled conversion for maximum stability.

The presence of a radio frequency signal on the receiver's antenna may be used to close any convenient warning system relay, turning on a lamp mounted on the dashboard of the vehicle or on the front of the receiver package.

While the invention has been described in connection with the application of a valve cap transmitter to the truck tire, it will be apparent that its utility is not restricted to trucks only. The device is so small and compact that it may be employed on passenger cars without detracting from the appearance of ornamental wheels.

Furthermore, the device may be used in connection with maintenance of a predetermined pressure or vacuum on any device in which a valve stem can accommodate a valve cap. Ordinarily, such systems involve threaded valve stems receiving threaded caps, but other types of air tight attachment might conceivably be used with the invention, by giving up some of the threaded-on switching features illustrated in the preferred specific embodiment.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described the invention what is claimed as new in support of Letters Patent is:

1. A valve cap transmitter which includes: a valve cap; a pressure chamber mounted on said valve cap; a radio transmitter mounted on the wall of said pressure chamber; a valve opening member in said valve cap for opening a valve when said cap is applied thereto, by contacting a movable valve member; walls defining a passage through said valve cap for placing the interior of said pressure chamber in communication with fluid released from a valve opened by said valve opening member; a pressure switch means in the wall of said pressure chamber and adapted to close when the difference in pressure between the interior and exterior of said pressure chamber attains a predetermined value; a valve switch means in said valve cap adapted to close when said valve cap is mounted in position on a valve; and electrical circuit means connecting said transmitter in series with said pressure switch and said valve cap switch for placing said transmitter in operation when both of said switches are in conducting position.

2. A valve cap transmitter which includes: a valve cap; a pressure chamber mounted on said valve cap; a radio transmitter mounted on the wall of said pressure chamber; a valve opening member in said valve cap for opening a valve when said cap is applied thereto, by contacting a movable valve member; walls defining a passage through said valve cap for placing the interior of said pressure chamber in communication with fluid released from a valve opened by said valve opening member; a resilient diaphragm in the wall of said pressure chamber, said diaphragm being resiliently deflected from a normal position by a predetermined difference in pressure between the interior and exterior of said pressure chamber; a pressure switch means operated between on and off positions by deflection of said diaphragm; a valve switch means in said valve cap adapted to close an electrical circuit when said valve cap is mounted in position on a valve; circuit means connecting said transmitter in series with said pressure switch and said valve cap switch for placing said transmitter in operation when both of said switches are in conducting position; antenna means external to said valve cap transmitter, and antenna connection means connecting said transmitter to said antenna through said valve and said valve cap when said valve is capped by said valve cap.

3. A valve cap transmitter adapted to be received in air tight mounting on a valve communicating with the interior of a non-metallic container for a fluid under a pressure substantially different from external ambient pressure, said valve containing a movable valve-opening body, which valve cap transmitter includes: a valve cap for air tight mounting on said valve; a pressure chamber mounted on said valve cap, said pressure chamber having rigid metallic walls; a radio transmitter mounted on said pressure chamber, exterior to its metallic walls; an antenna means comprised of an antenna extending into the interior of said non-metallic container, and an antenna connection means passing through said movable valve-opening body to the interior of said valve cap; means for connecting said antenna means to said transmitter when said cap is connected to said valve; a tubular valve actuator mounted in said cap and adapted to engage said movable valve-opening body of said valve and open same when said cap is mounted on said valve, said tubular valve actuator providing a passage for fluid between said open valve within said cap to the interior of said pressure chamber; pressure switch means in said valve chamber for closing an electrical circuit in response to difference in pressure between the interior and exterior of said pressure chamber; and electric circuit means for connecting said pressure switch means and said valve switch means to said transmitter in series, and for placing said transmitter in operation when both said switch means are closed.

4. A valve cap transmitter adapted to be received in air tight mounting on a valve communicating with the interior of a non-metallic container for a fluid under a pressure substantially different from external ambient pressure, said valve containing a movable valve-opening body, which valve cap transmitter includes: a valve cap for air tight mounting on said valve; a pressure chamber mounted on said valve cap, said pressure chamber having rigid metallic walls; a radio transmitter mounted on said pressure chamber, exterior to its metallic walls and having a first terminal connected to said metallic walls; a tubular valve actuator mounted in said cap and adapted to engage said movable valve opening body to open said valve when said cap is mounted on said valve, said tubular valve actuator providing a passage for fluid between said open valve within said cap to the interior of said pressure chamber; an antenna means comprised of an antenna extending into the interior of said non-metallic container, and an antenna connection means passing through said movable valve-opening body to the interior of said valve cap for contact with said valve actuator; insulating means between said valve actuator and said metallic walls of said pressure chambers; a pressure switch in said valve chamber for closing an electrical circuit in response to difference in pressure between the interior and exterior of said pressure chamber; valve switch means in said valve cap for connecting said pressure switch to said pressure chamber walls when said valve cap is mounted on said valve; and electric circuit means for placing said transmitter in operation by connection of said first transmitter terminal to a second transmitter terminal through said pressure chamber walls, said valve switch means, and said pressure switch.

5. A valve cap transmitter for capping a tire valve of an inflated automobile tire, and adapted to issue a radio signal when inflation pressure within said tire falls below a predetermined pressure, which valve cap transmitter includes: a valve cap received on said valve of said tire, and providing air tight cover therefor; a pressure chamber mounted on said valve cap; a radio transmitter mounted exterior to said pressure chamber; operating terminals in the walls of said pressure chamber for connection of said transmitter into operation; a valve actuator mounted in said cap and adapted to open said valve when said cap is mounted on said valve; walls defining a passage for air from said valve through said cap to the interior of said pressure chamber; antenna means inside said tire and passing through said valve to said valve cap; antenna lead means through said pressure chamber for connecting said antenna means to said transmitter when said cap is mounted on said valve; a valve switch means closed by the capping of said valve by means of said valve cap; a pressure-actuated switch in the wall of said pressure chamber, said switch being closed when interior tire inflation pressure approaches exterior atmospheric pressure within a predetermined difference; and electric circuit means for connecting said operating terminals of said transmitter through said valve switch means and said pressure-actuated switch in series, to place said transmitter in operation when both said switches are closed.

6. A valve cap transmitter for capping a tire valve of an inflated automobile tire, and adapted to issue a radio signal when inflation pressure within said tire falls below a predetermined pressure, which valve cap transmitter includes: a valve cap received on said valve of said tire, and providing air tight cover therefor; a pressure chamber mounted on said valve cap, said pressure chamber having rigid metallic walls; a radio transmitter mounted on said pressure chamber, exterior to its metallic walls; a tubular valve actuator mounted in said cap and adapted to open said valve when said cap is mounted on said valve, said tubular valve actuator having a passage for air from said valve through said cap to the interior of said pressure chamber; antenna means inside said tire and passing through said valve to said valve cap; antenna lead means through said pressure chamber for connecting said antenna means to said transmitter when said cap is mounted on said valve; a valve switch means closed by the capping of said valve by means of said valve cap; a pressure-actuated switch in the wall of said pressure chamber, said switch being closed when interior tire inflation pressure approaches exterior atmospheric pressure within a predetermined difference; battery means for operating said transmitter; and electric circuit means for connecting said battery means to said transmitter through said valve switch means and said pressure-actuated switch in series.

7. A valve cap transmitter for capping a tire valve of an inflated automobile tire, and adapted to issue a radio signal when inflation pressure within said tire falls below a predetermined pressure, which valve cap transmitter includes: a valve cap received on said valve of said tire, and providing air tight cover therefor; a pressure chamber mounted on said valve cap, said pressure chamber having rigid metallic walls; a radio transmitter mounted on said pressure chamber, exterior to its metallic walls; a tubular valve actuator mounted in said cap and adapted to open said valve when said cap is mounted on said valve, said tubular valve actuator having a passage for air from said valve through said cap to the interior of said pressure chamber; bushing means for insulating said valve actuator from said cap; antenna means inside said tire and passing through said valve to make contact with said tubular valve actuator when said cap is mounted on said valve; antenna lead means through said pressure chamber for connecting said tubular valve actuator to said transmitter; a valve switch means closed by the capping of said valve by means of said valve cap; a pressure-actuated switch in the wall of said pressure chamber, said switch being closed when interior tire inflation pressure approaches exterior atmospheric pressure within a predetermined difference; battery means for operating said transmitter; and electric circuit means for connecting said battery means to said transmitter through said valve switch means and said pressure-actuated switch in series.

8. A valve cap transmitter for capping a tire valve of an inflated automobile tire, and adapted to issue a radio signal when inflation pressure within said tire falls below a predetermined pressure, which valve cap transmitter includes: a valve cap received on said tire valve and providing air tight cover therefor; a pressure chamber integral with said valve cap; a transmitter including a ferrite antenna means, and operating terminals, said transmitter being mounted on the exterior of said pressure chamber; pressure diaphragm means on the wall of said pressure chamber adapted to be outwardly deflected by adequate inflation pressure for said tire, but resiliently assuming inward position when said tire inflation pressure falls below a predetermined pressure within said pressure chamber; a pressure switch means operated by said diaphragm when it assumes said inward position; a tubular valve opening probe mounted within said cap and adapted to open said valve when said cap is mounted on said valve, said probe being electrically conductive and having a passage for air from said valve through said cap to the interior of said pressure chamber; bushing means for insulating said probe from said cap; antenna means inside said tire and passing through said valve to make contact with said probe when said cap is mounted on said valve; antenna lead means through said pressure chamber for connecting said probe to said ferrite antenna means in said transmitter; valve switch means closed by capping said valve with said valve cap; and electric circuit means for connecting said transmitter operating terminals through said valve switch and said pressure switch when said valve cap is mounted on said valve and said inflation pressure falls below a predetermined value.

9. A valve cap transmitter for capping a tire valve of an inflated automobile tire, and adapted to issue a radio signal when inflation pressure within said tire falls below a predetermined pressure, which valve cap transmitter includes: a metal valve cap received on said tire valve and providing air tight cover therefor; a pressure chamber integral with said valve cap, said pressure chamber having rigid metallic walls; a transmitter including a ferrite antenna means, an electric battery, said transmitter being mounted on the exterior of the walls of said pressure chamber; non-metallic potting means enclosing said transmitter; pressure diaphragm means on the wall of said pressure chamber adapted to be outwardly deflected by adequate inflation pressure for said tire, but resiliently assuming inward position when said tire inflation pressure falls below a predetermined pressure within said pressure chamber; a pressure switch means operated by said diaphragm when it assumes said inward position; a tubular valve opening probe mounted within said cap and adapted to open said valve when said cap is mounted on said valve, said probe being electrically conductive and having a passage for air from said valve through said cap to the interior of said pressure chamber; bushing means for insulating said probe from said cap; antenna means inside said tire and passing through said valve to make contact with said probe when said cap is mounted on said valve; antenna lead means through said pressure chamber for connecting said probe to said ferrite antenna means in said transmitter; valve switch means closed by capping said valve with said valve cap; insulated circuit connection means extending from said valve switch to said pressure switch; insulated circuit means from said pressure switch to said transmitter; and grounding means for grounding said battery to said pressure chamber to provide electrical current to said transmitter through said valve switch and said pressure switch when said valve cap is mounted on said valve and said inflation pressure falls below a predetermined value.

10. A valve cap transmitter for capping a tire valve of an inflated automobile tire, and adapted to issue a radio signal when inflation pressure within said tire falls below a predetermined pressure, which valve cap transmitter includes: a metal valve cap received on said valve of said tire, and providing air tight cover therefor; a pressure chamber integral with said valve cap, said pressure chamber having rigid metallic walls; a transmitter including a circuit board, mounted on the exterior of the walls of said pressure chamber; transmitter circuit elements and an electric battery means mounted on said circuit board; a tuning coil assembly among said circuit elements, said tuning coil assembly comprising a tuning coil wound on an insulating coilform and a ferrite turning slug movable in said coilform; non-metallic potting means enclosing said transmitter circuit elements, and holding said ferrite slug in tuned position; pressure diaphragm means on the wall of said pressure chamber adapted to be outwardly deflected by adequate inflation pressure for said tire, but resiliently assuming inward position when said tire inflation pressure falls below a predetermined pressure within said pressure chamber; a pressure switch means operated by said diaphragm when it assumes said inward position; a tubular valve opening probe mounted within said cap and adapted to open said valve when said cap is mounted on said valve, said probe being electrically conductive and having a passage for air from said valve through said cap to the interior of said pressure chamber; bushing means for insulating said probe from said cap; antenna means inside said tire and passing through said valve to make contact with said probe when said cap is mounted on said valve; antenna lead means through said pressure chamber for connecting said probe to said tuning slug; annular metal contact means within said valve cap for contacting said valve; insulating means for insulating said annular metal contact means from said cap; insulated circuit connection means extending from said annular contact means to said pressure switch; insulated circuit means from said pressure switch to said transmitter; and grounding means for grounding said battery to said pressure chamber to provide electrical current to said transmitter through said valve and said pressure switch when said valve cap is mounted on said valve and said inflation pressure falls below a predetermined value.

No references cited.